US010223151B2

United States Patent
Carr et al.

(10) Patent No.: US 10,223,151 B2
(45) Date of Patent: *Mar. 5, 2019

(54) CREATING MULTIPLE LOCAL VIRTUAL MACHINES RUNNING MULTIPLE OPERATING SYSTEMS

(71) Applicant: International Business Machines Corporation, Armonk, NY (US)

(72) Inventors: Kevin G. Carr, Poughkeepsie, NY (US); Thomas D. Fitzsimmons, Lancaster, PA (US); Johnathon J. Hoste, Poughkeepsie, NY (US); Angel A. Merchan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,042

(22) Filed: Mar. 17, 2017

(65) Prior Publication Data

US 2018/0267817 A1 Sep. 20, 2018

(51) Int. Cl.
*G06F 9/455* (2018.01)

(52) U.S. Cl.
CPC ...... *G06F 9/45558* (2013.01); *G06F 9/45545* (2013.01); *G06F 2009/45562* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| 7,073,013 | B2 | 7/2006 | Lasser |
| 7,293,166 | B2 | 11/2007 | Nguyen et al. |
| 7,555,568 | B2 | 6/2009 | Huang |
| 7,664,836 | B2 | 2/2010 | Kim |
| 8,392,539 | B1 | 3/2013 | Chen et al. |
| 2008/0010446 | A1 | 1/2008 | Kim |
| 2009/0094447 | A1 | 4/2009 | Yang et al. |
| 2009/0172666 | A1* | 7/2009 | Yahalom ............... G06F 3/0605 718/1 |

(Continued)

OTHER PUBLICATIONS

Carr et al., "Creating Multiple Local Virtual Machines Running Multiple Operating Systems", U.S. Appl. No. 15/845,165, filed Dec. 18, 2017.

(Continued)

*Primary Examiner* — Sisley N Kim
(74) *Attorney, Agent, or Firm* — Daniel C. Housley

(57) ABSTRACT

A computer system with a hypervisor detects the local physical connection of a portable storage device with an operating system image thereon. The computer system installs an instance of the operating system on the hypervisor, and the hypervisor assigns a set of resources to the instance to generate a virtual machine. As further portable storage devices with operating systems thereon are locally, physically connected to the computer system, additional virtual machines are generated, each with a different operating system instance, which may be the same or different from the other operating system instances. The resources of the computer system are assigned and reassigned among the virtual machines as the portable storage devices are connected and disconnected.

13 Claims, 5 Drawing Sheets

(56) References Cited

U.S. PATENT DOCUMENTS

| | | |
|---|---|---|
| 2010/0017566 A1 | 1/2010 | Danilak |
| 2010/0042753 A1* | 2/2010 | Whaley ................. G06F 13/102 710/13 |
| 2014/0372742 A1* | 12/2014 | Hayakawa .............. G06F 9/441 713/2 |
| 2015/0248333 A1* | 9/2015 | Aravot ................ G06F 11/1456 711/162 |
| 2016/0004554 A1* | 1/2016 | Minezaki ................ G06F 11/20 718/1 |
| 2016/0179553 A1 | 6/2016 | Sliwa et al. |
| 2016/0239321 A1 | 8/2016 | Dong et al. |

OTHER PUBLICATIONS

List of IBM Patents or Patent Applications Treated as Related, dated Dec. 18, 2017, 2 pages.

Carr et al., "Creating Multiple Local Virtual Machines Running Multiple Operating Systems", U.S. Appl. No. 15/894,991, filed Feb. 13, 2018.

List of IBM Patents or Patent Applications Treated as Related, dated Feb. 12, 2018, 2 pages.

Accelerated Examination Support Document, dated Jan. 30, 2018, 16 pages.

\* cited by examiner

CREATING MULTIPLE LOCAL VIRTUAL MACHINES RUNNING MULTIPLE OPERATING SYSTEMS

BACKGROUND

The present disclosure relates generally to the field of computer systems, and more particularly to using a computer system with a hypervisor to create multiple local virtual machines running different operating systems.

Hypervisors, also referred to as virtual machine managers, manage one or more virtual machines. Hypervisors can allocate system resources to virtual machines by assigning shares of physical devices/hardware to the virtual machines that run on, and are managed by, the hypervisor. This virtualization can allow multiple virtual machines to run on top of a single physical host by sharing host resources between the multiple virtual machines.

SUMMARY

Embodiments of the present disclosure include a method, computer program product, and system for generating virtual machines running operating systems from portable storage devices as they are locally connected to a computer system with a plurality of resources, a plurality of portable storage device ports, and a hypervisor. A local physical connection of a first portable storage device with an operating system image thereon to a first portable storage device port of the computer system is detected. A first virtual machine running the first operating system is generated, via the hypervisor, by loading the first operating system from the first operating system image on the first portable storage device and assigning a first set of the plurality of resources to the first operating system. A local physical connection of a second portable storage device with an operating system image thereon to a second portable storage device port of the computer system is detected while the first virtual machine is running. A second virtual machine running the second operating system is generated, via the hypervisor, by loading the second operating system from the second operating system image on the second portable storage device and assigning a second set of the plurality of resources to the second operating system. The assigning of the second set of the plurality of resources comprises reassigning resources from the first set of the plurality of resources.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
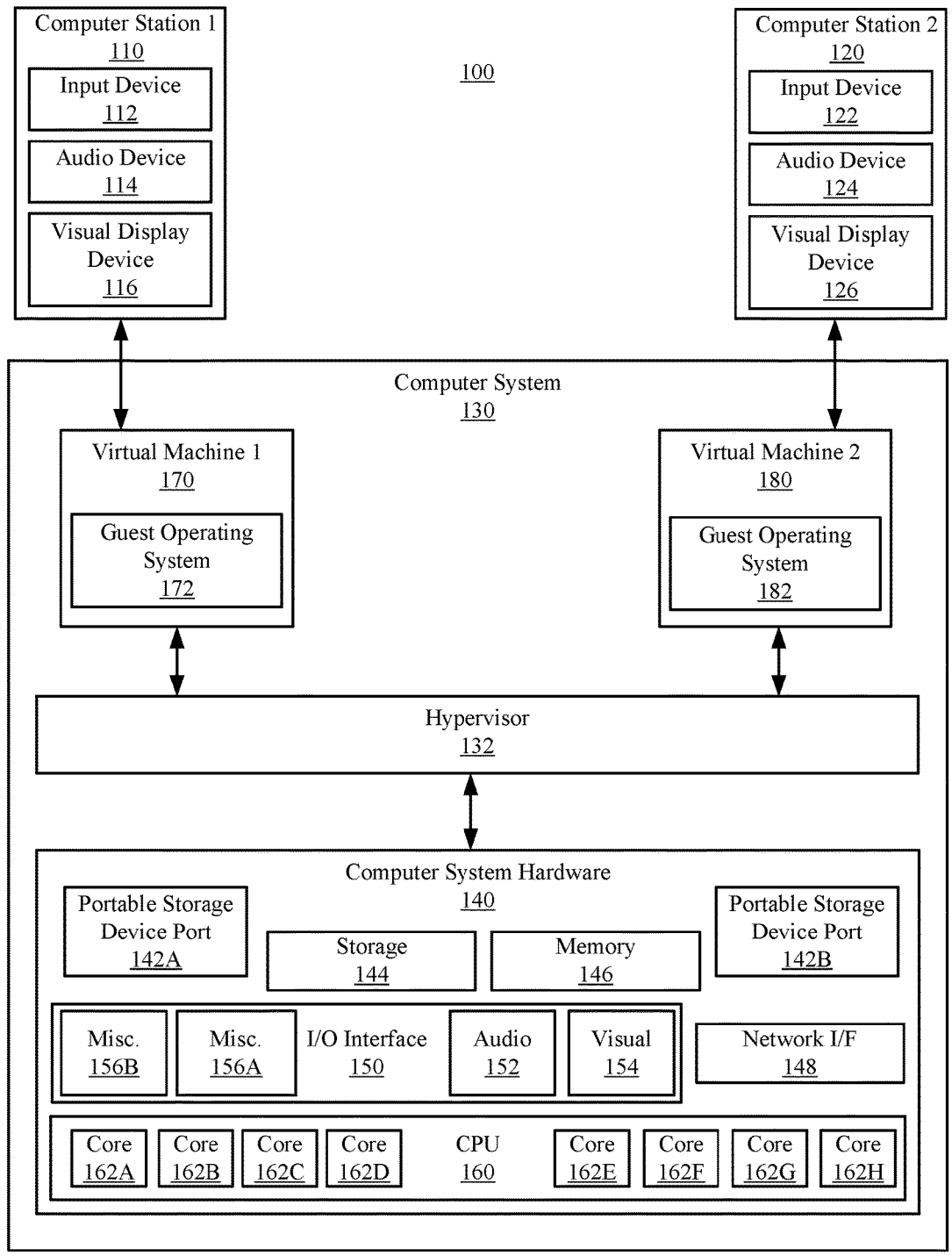
FIG. 1 illustrates a block diagram of an example local environment with a computing system running a type 1 hypervisor in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer systems, and more particularly to using a computer system with a hypervisor to create multiple local virtual machines running different operating systems. While the present disclosure is not necessarily limited to such applications, various aspects of the disclosure may be appreciated through a discussion of various examples using this context.

Providing and setting up workstations, for example, desktop computers for students in a school computer laboratory, can be expensive and time-consuming. It can also be frustrating for the user of such a workstation, as it may not come with the operating system or programs the user is familiar with and adept at using. A single computer system capable of running multiple operating system instances from portable storage devices may allow for conservation of costs and reduced setup times; it may also allow for user-customization of operating systems and programs.

A hypervisor executing on a computer system may allow for several operating system instances to run simultaneously on a single computer system. A type 1 hypervisor may run directly on top of a computer system's hardware and allow for 100% of the computer system's resources to be assigned to virtual machines. A type 2 hypervisor may operate as an application on top of an existing operating system. This will require a particular percentage of the computer system's resources to be dedicated to the existing operating system. Each operating system instance may be an identical operating system, or each instance may be a different operating system. For example, in embodiments, all instances running on a hypervisor may be LINUX, or each instance could be a different operating system, such as WINDOWS, MACOS, and LINUX on a hypervisor running three separate operating system instances.

Portable storage devices, for example, bootable universal serial bus (USB) drives, DVDs, CDs, diskettes, etc., may be configured to allow a hypervisor to boot an instance of any given operating system from that device. The portable storage device may further store a particular user's files and programs with which the user is familiar, comfortable, and adept at using.

Various embodiments are directed toward a computer system with a hypervisor capable of running multiple operating system instances simultaneously from portable storage devices. As discussed herein, either type 1 or type 2 hypervisors may be used to allow the computer system to run multiple, different operating system instances simultaneously. In some embodiments, bootable USB drives or other portable storage devices may store a user's preferred operating system and program files so that, when physically connected to the computer system, the hypervisor may generate a virtual machine running the user's preferred operating system. In embodiments, this virtual machine may be associated with a particular local computer station, or set of peripheral I/O devices, so that the user may, simultaneously and alongside other users, utilize the user's preferred operating system and programs from a single computer system.

The present disclosure will now be described in detail with reference to the Figures. FIG. 1 is a block diagram of an example computing environment 100 in which illustrative embodiments of the present disclosure may be implemented. In some embodiments, the computing environment 100 may include two or more computer stations 110 and 120, and a computer system 130.

The computer stations 110 and 120 may comprise input devices 112 and 122, audio devices 114 and 124, and visual display devices 116 and 126. Input devices 112 and 122 may include, for example, a keyboard, mouse, trackball, touchpad, microphone, or any other input device capable of establishing a physical connection with the computer system 130. Audio devices 114 and 124 may include, for example, speakers, headphones, earbuds, or any other audio device capable of establishing a physical connection with the computer system 130. Visual display devices 116 and 126 may include graphic monitors, touchscreens, projectors, or any other visual display device capable of establishing a physical connection with the computer system 130.

Computer system 130 may include an exemplary set of computer system hardware 140. Computer system hardware 140 may be used in implementing one or more of the methods or modules, and any related functions or operations, described herein (e.g., using one or more processor circuits or computer processors of the computer), in accordance with embodiments of the present disclosure. In some embodiments, the major components of the computer system hardware 140 may comprise one or more CPUs 160, a memory subsystem 146, a storage interface 144, an I/O (Input/Output) device interface 150, a network interface 148, and one or more portable storage device ports 142A-B, all of which may be communicatively coupled, directly or indirectly.

The computer system hardware 140 may contain one or more general-purpose programmable central processing units (CPUs) 160 with one or more cores 162A-H. In some embodiments, the computer system hardware 140 may contain multiple processors typical of a relatively large system; however, in other embodiments the computer system 130 may alternatively be a single CPU system. Each CPU 160 may execute instructions stored in the memory subsystem 146 and may comprise one or more levels of on-board cache.

In some embodiments, the memory subsystem 146 may comprise a random-access semiconductor memory, storage device, or storage medium (either volatile or non-volatile) for storing data and programs. In some embodiments, the memory subsystem 146 may represent the entire virtual memory of the computer system hardware 140, and may also include the virtual memory of other computer systems coupled to the computer system 130 or connected via a network. The memory subsystem 146 may be conceptually a single monolithic entity, but, in some embodiments, the memory subsystem 146 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 146 may contain elements for control and flow of memory used by the CPU 160.

In some embodiments, the I/O interface 150 may include one or more interfaces for audio devices 152, visual devices 154, and miscellaneous devices 156A-B. These interfaces may correlate to various ports in FIG. 3, such as video device ports 310A-C, USB device ports 315A-F, audio input ports 320A-C, and audio output ports 325A-C.

It is noted that computer system hardware 140 is intended to depict the representative major components of an exemplary set of computer system hardware 140. In some embodiments, however, individual components may have greater or lesser complexity than as represented in this diagram, components other than or in addition to those shown in this diagram may be present, and the number, type, and configuration of such components may vary.

In some embodiments, the computer stations 110 and 120 may enable users to interact with one or more virtual machines (VMs) 170 and 180 running on the computer system 130 via the hypervisor 132. For example, the computer stations 110 and 120 may include a monitor and peripheral hardware (e.g., keyboard, mouse, etc.) that are locally and communicatively coupled to the computer system 130 and hypervisor 132. In embodiments, a user of the first computer station 110 may control a first virtual machine 170 executing on the computer system 130 via hypervisor 132. Likewise, a user of the second computer station 120 may control a second virtual machine 180 executing on the computer system 130 via hypervisor 132.

In some embodiments, the hypervisor 132 may be a type 1 hypervisor. As discussed above, a type 1 hypervisor contemplates a configuration where the hypervisor 132 runs directly on the computer system hardware 140.

In some embodiments, the hypervisor 132 may host the first virtual machine 170 and the second virtual machine 180. The virtual machines 170 and 180 may include guest operating systems 172 and 182, respectively. Guest operating systems 172 and 182 may be operating system instances, as described herein. The hypervisor 132 may establish one or more resource assignments to the virtual machines 170 and 180. Each resource assignment may correspond to a specific system resource (e.g., CPU 160, cores 162A-H, memory 146, and/or storage 144), or a portion of a system resource. The resource assignments may establish the amount of the system resources that are allocated to the virtual machines 170 and 180.

The hypervisor 132 may be configured to assign computer system resources (e.g., portions of the computer system hardware 140) to virtual machines (e.g., the first virtual machine 170 and the second virtual machine 180). The hypervisor 132 may be configured to assign a percentage of the resources to the virtual machines 170 and 180 based upon the number of virtual machines 170 and 180. For example, when one virtual machine is running, that virtual machine may have 100% of the computer system 130's resources assigned to it. When a second virtual machine is generated, the first virtual machine's share of the computer system's resources may be scaled back to 50%, and the other 50% of the computer system 130's resources may be allocated to the second virtual machine. When a third virtual machine is generated, the first and second virtual machines' resources may be scaled back to 33%, and the remaining 33% of the computer system 130's resources may be assigned to the third virtual machine. In embodiments, there may be any number of virtual machines 170 and 180, and there may be a limit to the number of virtual machines a particular hypervisor may run simultaneously. For example, the number of virtual machines may be limited to the number of CPU cores 162A-H in the computer system 132.

In some embodiments, the computer system 130's resources may not be completely distributed to the virtual machines 170 and 180, or the distribution may not be completely even among the virtual machines 170 and 180. For example, in embodiments, virtual machine 170 may have 75% of the computer system 130's resources assigned thereto initially, with 25% of computer system 130's resources remaining unassigned. When virtual machine 180 is generated, the computer system 130's resources may be reassigned such that each virtual machine may have 40% of the computer system 130's resources assigned thereto.

In embodiments, virtual machine 170 may have 65% of the computer system 130's resources assigned thereto initially, and when virtual machine 180 is generated, the computer system 130's resources may be reassigned such that virtual machine 170 may have 30% of the computer system 130's resources assigned thereto, while virtual machine 180 may have 50% of the computer system 130's resources assigned thereto. In embodiments, any percentage of computer system 130's resources may be assigned or reassigned to the virtual machines 170 and 180.

While FIG. 1 illustrates a computing environment 100 with a single computer system 130 and two computer stations 110 and 120, and two virtual machines 170 and 180, suitable computing environments for implementing embodiments of this disclosure may include any number of computer stations and virtual machines.

Figure 2:
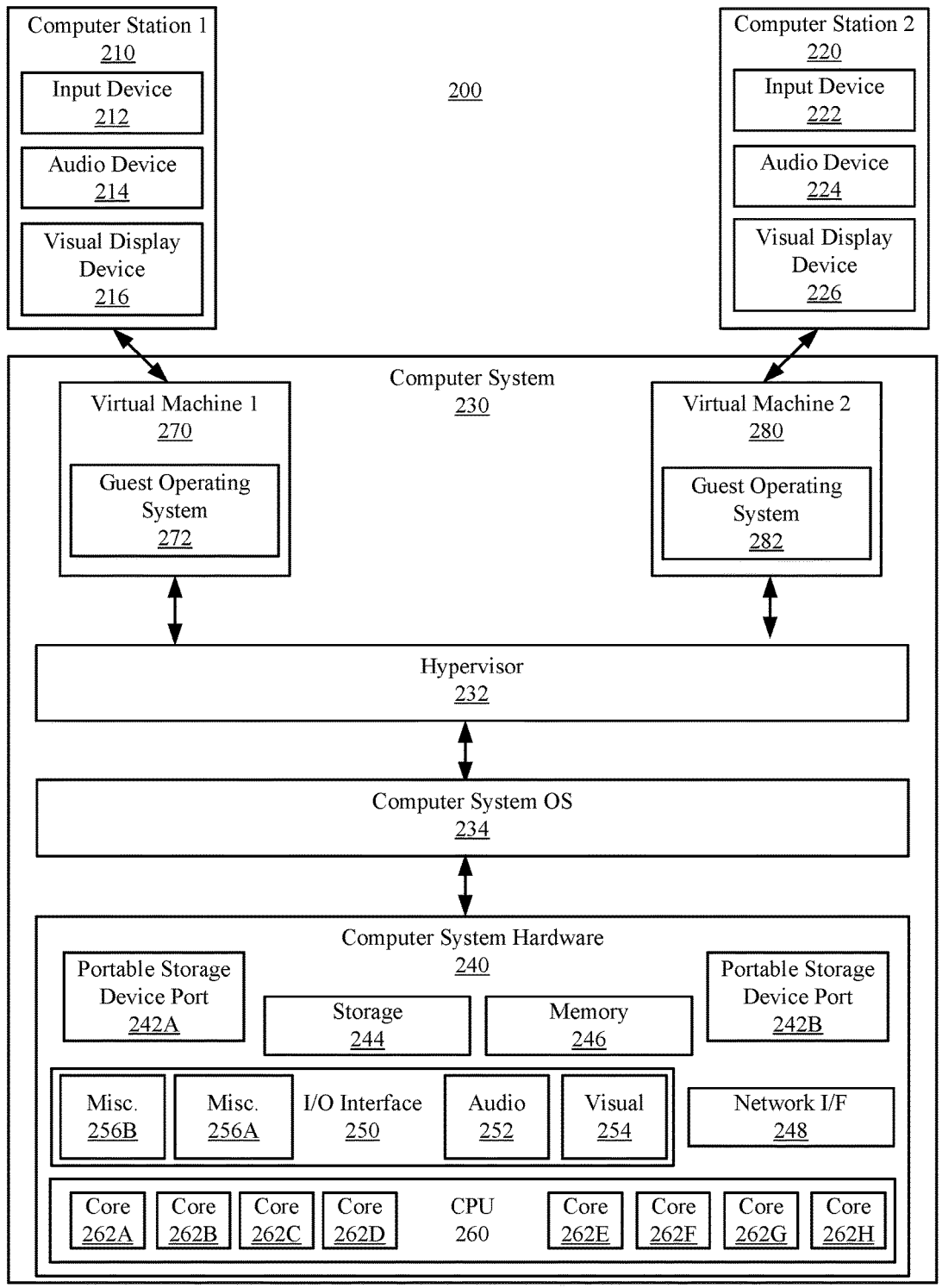
FIG. 2 illustrates a block diagram of an example local environment with a computing system running a type 2 hypervisor in which illustrative embodiments of the present disclosure may be implemented.

FIG. 2 illustrates a block diagram of an example computing environment 200 in which illustrative embodiments of the present disclosure may be implemented. In some embodiments, the computing environment 200 may include two or more computer stations 210 and 220, and a computer system 230.

The computer stations 210 and 220 may comprise input devices 212 and 222, audio devices 214 and 224, and visual display devices 216 and 226. Input devices 212 and 222 may include, for example, a keyboard, mouse, trackball, touchpad, microphone, or any other input device capable of establishing a physical connection with the computer system 230. Audio devices 214 and 224 may include, for example, speakers, headphones, earbuds, or any other audio device capable of establishing a physical connection with the computer system 230. Visual display devices 216 and 226 may include graphic monitors, touchscreens, projectors, or any other visual display device capable of establishing a physical connection with the computer system 230.

In some embodiments, the computer system 230 may be a multi-user mainframe computer system, a single-user system, or a server computer or similar device that has little or no direct user interface, but receives requests via virtual machines 270 and 280 and their associated computer stations 210 and 220. Further, in some embodiments, the computer system 230 may be implemented as a desktop computer, portable computer, laptop or notebook computer, tablet computer, or any other appropriate type of electronic device.

Computer system 230 may include an exemplary set of computer system hardware 240. Computer system hardware 240 may be used in implementing one or more of the methods or modules, and any related functions or operations, described herein (e.g., using one or more processor circuits or computer processors of the computer), in accordance with embodiments of the present disclosure. In some embodiments, the major components of the computer system hardware 240 may comprise one or more CPUs 260, a memory subsystem 246, a storage interface 244, an I/O (Input/Output) device interface 250, a network interface 248, and one or more portable storage device ports 242A-B, all of which may be communicatively coupled, directly or indirectly.

The computer system hardware 240 may contain one or more general-purpose programmable central processing units (CPUs) 260 with one or more cores 262A-H. In some embodiments, the computer system hardware 240 may contain multiple processors typical of a relatively large system; however, in other embodiments the computer system 230 may alternatively be a single CPU system. Each CPU 260 may execute instructions stored in the memory subsystem 246 and may comprise one or more levels of on-board cache.

In some embodiments, the memory subsystem 246 may comprise a random-access semiconductor memory, storage device, or storage medium (either volatile or non-volatile) for storing data and programs. In some embodiments, the memory subsystem 246 may represent the entire virtual memory of the computer system hardware 240, and may also include the virtual memory of other computer systems coupled to the computer system 230 or connected via a network. The memory subsystem 246 may be conceptually a single monolithic entity, but, in some embodiments, the memory subsystem 246 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 246 may contain elements for control and flow of memory used by the CPU 260.

In some embodiments, the I/O interface 250 may include one or more interfaces for audio devices 252, visual devices 254, and miscellaneous devices 256A-B. These interfaces may correlate to various ports in FIG. 3, such as video device ports 310A-C, USB device ports 315A-F, audio input ports 320A-C, and audio output ports 325A-C.

It is noted that computer system hardware 240 is intended to depict the representative major components of an exemplary set of computer system hardware 240. In some embodiments, however, individual components may have greater or lesser complexity than as represented in this diagram, components other than or in addition to those shown in this diagram may be present, and the number, type, and configuration of such components may vary.

In some embodiments, the computer stations 210 and 220 may enable users to interact with one or more virtual machines (VMs) 270 and 280 running on the computer system 230 via the hypervisor 232. For example, the computer stations 210 and 220 may include a monitor and peripheral hardware (e.g., keyboard, mouse, etc.) that are locally and communicatively coupled to the computer system 230 and hypervisor 232. In embodiments, a user of the first computer station 210 may control a first virtual machine 270 executing on the computer system 230 via hypervisor 232. Likewise, a user of the second computer station 220 may control a second virtual machine 280 executing on the computer system 230 via hypervisor 232.

In some embodiments, the hypervisor 232 may be a type 2 hypervisor. As discussed above, a type 2 hypervisor contemplates a configuration where the hypervisor 232 runs as an application on top of the computer system OS 234.

In some embodiments, the hypervisor 232 may host the first virtual machine 270 and the second virtual machine 280. The virtual machines 270 and 280 may include guest operating systems 272 and 282, respectively. Guest operating systems 172 and 182 may be operating system instances, as described herein. The hypervisor 232 may establish one or more resource assignments to the virtual machines 270 and 280. Each resource assignment may correspond to a specific system resource (e.g., CPU 260, cores 262A-H, memory 246, and/or storage 244), or a portion of a system resource. The resource assignments may establish the amount of the system resources that are allocated to the virtual machines 270 and 280.

The hypervisor 232 may be configured to assign computer system resources (e.g., portions of the computer system hardware 240) to virtual machines (e.g., the first virtual machine 270 and the second virtual machine 280). The hypervisor 232 may be configured to assign a percentage of the resources to the virtual machines 270 and 280 based upon the number of virtual machines 270 and 280. For example, when one virtual machine is running, the computer system OS 234 may require 10% of the computer system 230's resources, and the virtual machine may have 90% of the computer system's resources assigned to it. When a second virtual machine is generated, the first virtual machine's share of the computer system's resources may be scaled back to 45%, and the other 45% of the computer system 230's resources may be allocated to the second virtual machine. When a third virtual machine is generated, the first and second virtual machines' resources may be scaled back to 30%, and the remaining 30% of the computer system 230's resources may be assigned to the third virtual machine. There may be a limit to the number of virtual machines a particular hypervisor may run simultaneously. For example, the number of virtual machines may be limited to the number of CPU cores 262A-H in the computer system 232.

In some embodiments, the computer system 230's resources, excluding the percentage assigned to the computer system OS 234, may not be completely distributed among the virtual machines 270 and 280, or the distribution may not be completely even among the virtual machines 270 and 280. For example, in embodiments, the computer system OS 234 may have 15% of the computer system 230's resources assigned thereto; virtual machine 270 may have 75% of the computer system 230's resources assigned thereto initially, with 10% of the computer system 230's resources remaining unassigned. When virtual machine 280 is generated, the computer system 230's resources may be reassigned such that each virtual machine has 40% of the computer system 230's resources assigned thereto, and the computer system OS 234 may have 20% of the computer system 230's resources assigned thereto.

In embodiments, the computer system OS 234 may have 35% of the computer system 230's resources assigned thereto, and virtual machine 270 may have 65% of the computer system 230's resources assigned thereto initially. When virtual machine 280 is generated, the computer system 230's resources may be reassigned such that virtual machine 270 may have 30% of the computer system 230's resources assigned thereto, while virtual machine 280 may have 50% of the computer system 230's resources assigned thereto, and the computer system OS 234 may have 20% of the computer system 230's resources assigned thereto. In embodiments, any percentage of computer system 230's resources may be assigned or reassigned to the virtual machines 270 and 280, and the computer system OS 234.

While FIG. 2 illustrates a computing environment 200 with a single computer system 230 and two computer stations 210 and 220, and two virtual machines 270 and 280, suitable computing environments for implementing embodiments of this disclosure may include any number of computer stations and virtual machines.

Figure 3:
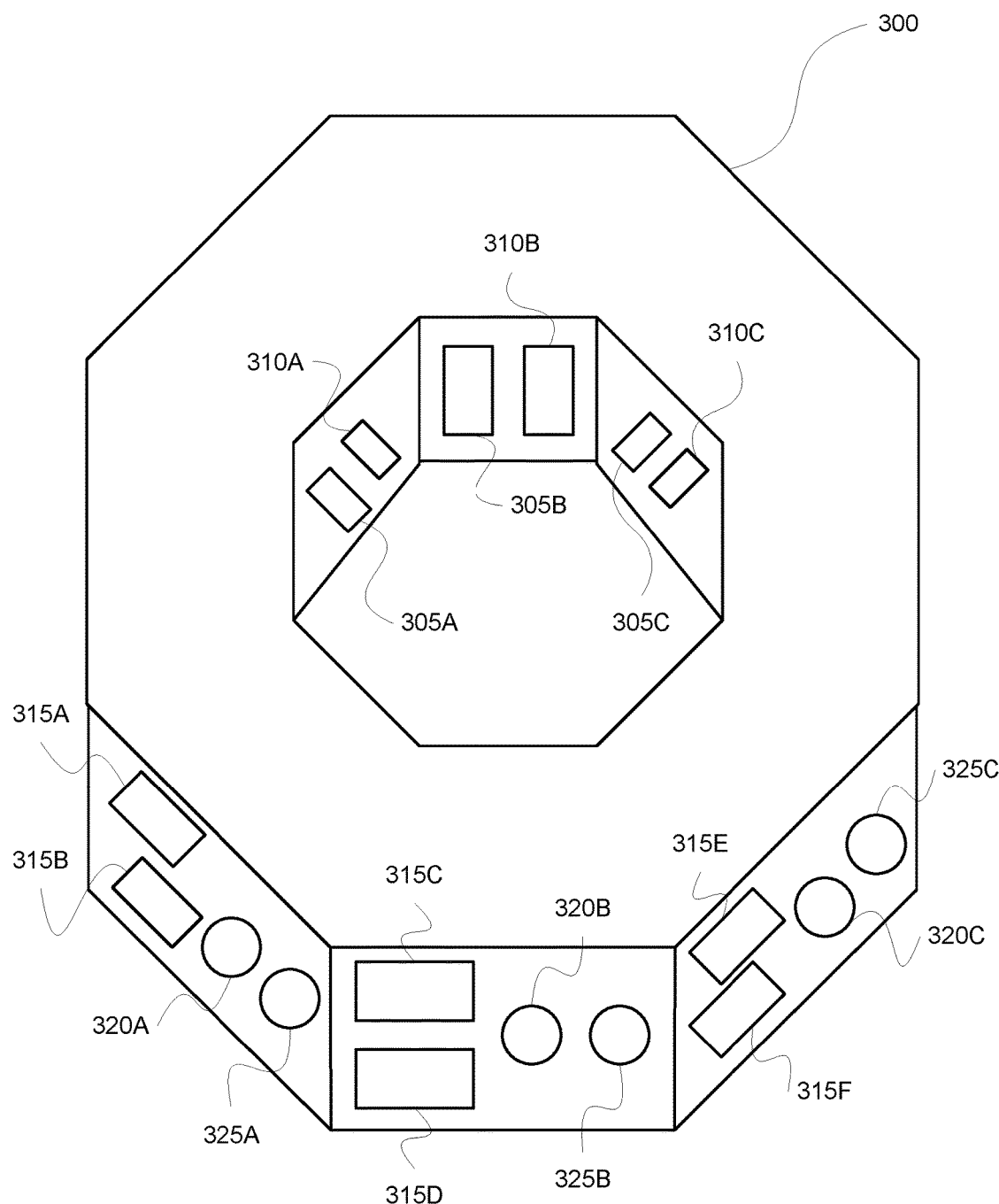
FIG. 3 illustrates a diagram of an example eight-user device in which illustrative embodiments of the present disclosure may be implemented.

Turning now to FIG. 3, illustrated is a diagram of an exemplary eight-user device 300 in which illustrative embodiments of the present disclosure may be implemented. The exemplary eight-user device 300 illustrated is an octagonal ring structure; each side of the inner surface may be identical to every other side of the inner surface, even though only 3 sides are shown/described herein. Each side of the outer surface may be identical to every other side of the outer surface, even though only 3 sides are shown/described herein. Various shapes and configurations may be used, and the device may be configured to support any number of users; the fact that the present figure illustrates an eight-user device should in no way limit the number of users in other embodiments.

In FIG. 3, the eight-user device 300 shows power supply ports 305A-C which may each be associated with a different potential virtual machine. Potential virtual machines associated with the various ports described herein may be generated according to the methods described herein, via, for example, the computer systems contemplated in FIGS. 1 and 2, and may correlate to the virtual machines 170 and 180 of FIG. 1 or the virtual machines 270 and 280 of FIG. 2. For example, power supply port 205A may be associated with a potential virtual machine which correlates to virtual machine 170 of FIG. 1 or virtual machine 280 of FIG. 2. Power supply ports 305A-C may be configured for 110 v, 220 v, or any other electrical specification.

The eight-user device 300 may include visual device ports 310A-C. The visual device ports 310A-C may each be associated with a different potential virtual machine, as described herein. For example, visual device port 310A may be associated with a potential virtual machine which correlates to virtual machine 170 of FIG. 1 and visual device port 310B may be associated with a potential virtual machine which correlates to virtual machine 180 of FIG. 1. Alternatively, visual device ports 310A and 310B may be associated with potential virtual machines which correlate to virtual machines 270 and 280 of FIG. 2, respectively. The visual device ports 310A-C may comply with VGA, DVI, HDMI, or any other video display standard.

The eight-user device 300 may include USB ports 315A-F. The USB ports 315A-F may be each associated with a different potential virtual machine, as described herein. For example, USB port 315A may be associated with a potential virtual machine which correlates to virtual machine 170 of FIG. 1 and USB port 315C may be associated with a potential virtual machine which correlates to virtual machine 180 of FIG. 1. Alternatively, USB ports 315A and 315C may be associated with potential virtual machines which correlate to virtual machines 270 and 280 of FIG. 2, respectively. USB ports 315A-F may be configured, as disclosed herein, to detect the connection of a bootable USB device with an operating system image thereon to generate a virtual machine with an instance of that same operating system running thereon. The USB ports 315A-F may comply with USB 1.x, 2.0, 3.0, 3.1, or any other USB standard.

The eight-user device 300 may include audio input ports 320A-C. The audio input ports 320A-C may be each be associated with a different potential virtual machine, as described herein. For example, audio input port 320A may be associated with a potential virtual machine which correlates to virtual machine 170 of FIG. 1 and audio input port 320B may be associated with a potential virtual machine which correlates to virtual machine 180 of FIG. 1. Alternatively, audio input ports 320A and 320B may be associated with potential virtual machines which correlate to virtual machines 270 and 280 of FIG. 2, respectively. The audio input ports 320A-C may comply with 2.5 mm, 3.5 mm, 6.35 mm or any other audio jack size and may support mono or stereo standards. The audio device(s) may be a microphone, a microphone and speakers, a headset with a microphone, or any other suitable audio device.

The eight-user device 300 may include audio output ports 325A-C. The audio output ports 325A-C may each be associated with a different potential virtual machine, as described herein. For example, audio output port 325A may be associated with a potential virtual machine which correlates to virtual machine 170 of FIG. 1 and audio output port 325B may be associated with a potential virtual machine which correlates to virtual machine 180 of FIG. 1. Alternatively, audio output ports 325A and 325B may be associated with potential virtual machines which correlate to virtual machines 270 and 280 of FIG. 2, respectively. The audio output ports 325A-C may comply with 2.5 mm, 3.5 mm, 6.35 mm or any other audio jack size and may support mono or stereo standards. The audio device(s) may be speakers, earbuds, a headset, a microphone and speakers, a headset with a microphone, or any other suitable audio device.

In embodiments, sets of the aforementioned ports may each be associated with a different potential virtual machine, as described herein, and a particular computer station. For example, power supply port 305A, visual display port 310A, USB ports 315A and 315B, audio input port 320A, and audio output port 325A may all be associated with a particular potential virtual machine which, when the virtual machine is generated, correlates to a particular virtual machine, such as, for example, virtual machine 170 of FIG. 1 or virtual machine 270 of FIG. 2. This set of ports may further be associated with a particular computer station, such as computer station 110 of FIG. 1, or computer station 210 of FIG. 2.

While FIG. 3 illustrates an exemplary eight-user device 300 with a particular number and arrangement of power supply ports 305A-C, visual device ports 310A-C, USB ports 315A-F, audio input ports 320A-C and audio output ports 325A-C, suitable devices for implementing embodiments of this disclosure may support any number of users and include any number of power supply ports, visual device ports, USB ports, audio input ports, and audio output ports. In embodiments, some ports may be excluded entirely, such as audio input ports.

Figure 4:
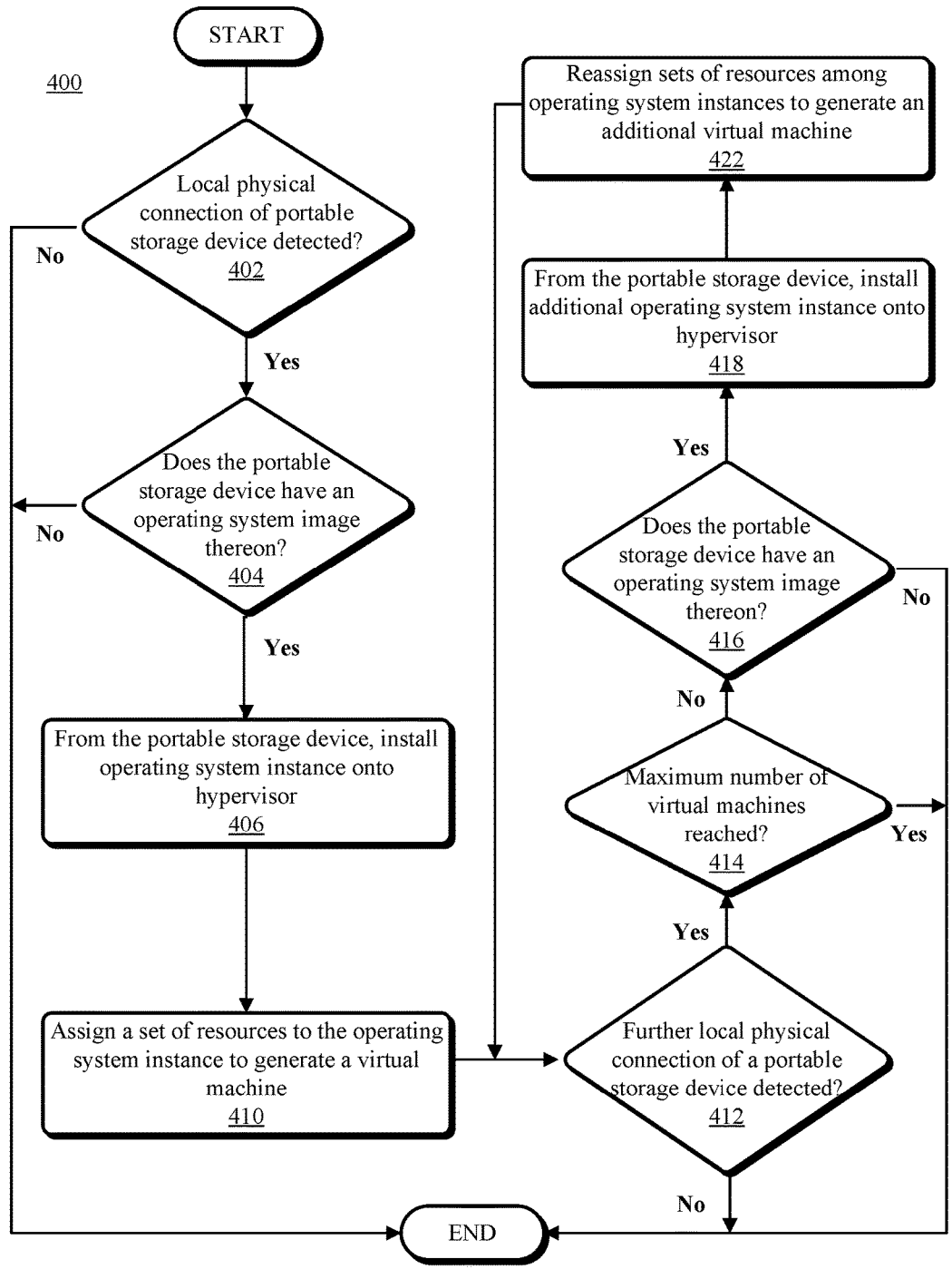
FIG. 4 illustrates a flowchart of an example method for locally connecting portable storage devices with operating systems thereon to create one or more virtual machines running multiple operating systems, in accordance with embodiments of the present disclosure.

Turning now to FIG. 4, illustrated is a flowchart of an example method 400 for creating one or more virtual machines running separate operating systems loaded from locally connected portable storage devices in a computing environment, in accordance with embodiments of the present disclosure. The computing environment may include, for example, computer system 130 of FIG. 1 or computer system 230 of FIG. 2, and may take on the embodiment of exemplary eight-user device 300 of FIG. 3.

If, at 402, a local physical connection of a portable storage device is detected, then a check is performed at 404 to determine whether the portable storage device has an operating system image stored thereon. For example, a local physical connection of a USB drive may be detected at a USB port, such as the USB port 315A in FIG. 3. USB port 315A may correlate to portable storage device port 142A in FIG. 1 or portable storage device port 242A in FIG. 2. The connected USB drive may have an operating system image stored thereon. For example, the USB drive may have an image of WINDOWS 8, RED HAT LINUX, MACOS, etc. thereon.

If, at 404, it is determined that the portable storage device has an operating system thereon, then an instance of that operating system may be installed onto the hypervisor at 406.

For example, if the USB drive has an operating system thereon, an instance of that operating system may be installed on the hypervisor. For example, if the USB drive has RED HAT LINUX thereon, an instance of RED HAT LINUX may be installed on the hypervisor.

At 410, a set of resources from a plurality of resources may be assigned to the operating system instance to generate a virtual machine. A set of resources may include control of a portion or all of a computer system's hardware. For example, if the hypervisor is a type 1 hypervisor, 100% of the computer system's hardware may be assigned to the operating system instance on the virtual machine. For example, if the operating system instance is WINDOWS 7, 100% of the plurality of resources may be assigned to the WINDOWS 7 instance. If the hypervisor is a type 2 hypervisor, then a particular set of the plurality of resources may be reserved for the computer system OS, correlating to the computer system OS 234 of FIG. 2, and the remainder of the plurality of resources may be assigned, as a set, to the virtual machine. For example, if the computer system OS is LINUX KERNEL-BASED VIRTUAL MACHINE (KVM) and the operating system instance is MACOS, then a set of resources comprising 15% of the plurality of resources may be reserved for KVM, and the remaining 85% of the plurality of resources may be assigned, as a set, to the MACOS instance.

If, at 412, a further local physical connection of a portable storage device is detected, then a check is performed at 414 to determine whether the maximum number of virtual machines has been reached. For example, another local physical connection of a USB drive may be detected at a USB port, such as the USB port 315C in FIG. 3. USB port 315C may correlate to portable storage device port 142B in FIG. 1 or portable storage device port 242B in FIG. 2. The connected USB drive may have an operating system thereon. For example, the USB drive may have WINDOWS 8, RED HAT LINUX, MACOS, etc. thereon.

If, at 414, it is determined that the maximum number of virtual machines has not been reached, then a check is performed at 416 to determine whether the portable storage device has an operating system thereon. For example, if the maximum number of virtual machines is four, and there are already four virtual machines, the method may end. For example, if the computer system has eight CPU cores, and the number of virtual machines is limited to the number of CPU cores in the computer system, then when eight virtual machines are running on the hypervisor of that computer system, the method will not result in the generation of any additional virtual machines. If, for example, the maximum number of virtual machines is eight, and there are seven virtual machines running on the hypervisor, the method may proceed to 416 to determine whether the portable storage device has an operating system thereon.

If, at 416, it is determined that the portable storage device has an operating system image thereon, then an instance of that operating system may be installed onto the hypervisor at 418. For example, if the USB drive has an operating system thereon, an instance of that operating system may be installed on the hypervisor. For example, if the USB drive has UBUNTU thereon, an instance of UBUNTU may be installed on the hypervisor.

At 422, the plurality of resources is reassigned, by sets, among the operating system instances to generate an additional virtual machine. A set of resources may include control of a portion or all of a computer system's hardware. For example, if the hypervisor is a type 1 hypervisor, and the most recently installed operating system instance is the second operating system instance running on the hypervisor, then the computer system's resources may be reassigned among the two operating system instances, such that 50% of the computer system's plurality of resources may be assigned to the first operating system instance, with the remaining 50% assigned to the second operating system instance. For example, if the first operating system instance is WINDOWS 7, and the second operating system instance is WINDOWS 8, 50% of the plurality of resources may be assigned to the WINDOWS 7 instance, and 50% of the plurality of resources may be assigned to the WINDOWS 8 instance. If the hypervisor is a type 2 hypervisor, then a particular set of the plurality of resources may be reserved for the computer system OS, correlating to the computer system OS 234 of FIG. 2, and the remainder of the plurality of resources may be assigned, as a set, to the virtual machines. For example, if the computer system OS is LINUX KERNEL-BASED VIRTUAL MACHINE (KVM), the first operating system instance is UBUNTU, and the second operating system instance is MACOS, then a set of resources comprising 15% of the plurality of resources may be reserved for KVM, a set of resources comprising 42.5% of the plurality of resources may be assigned to the UBUNTU instance, and the remaining 42.5% of the plurality of resources may be assigned, as a set, to the MACOS instance.

Figure 5:
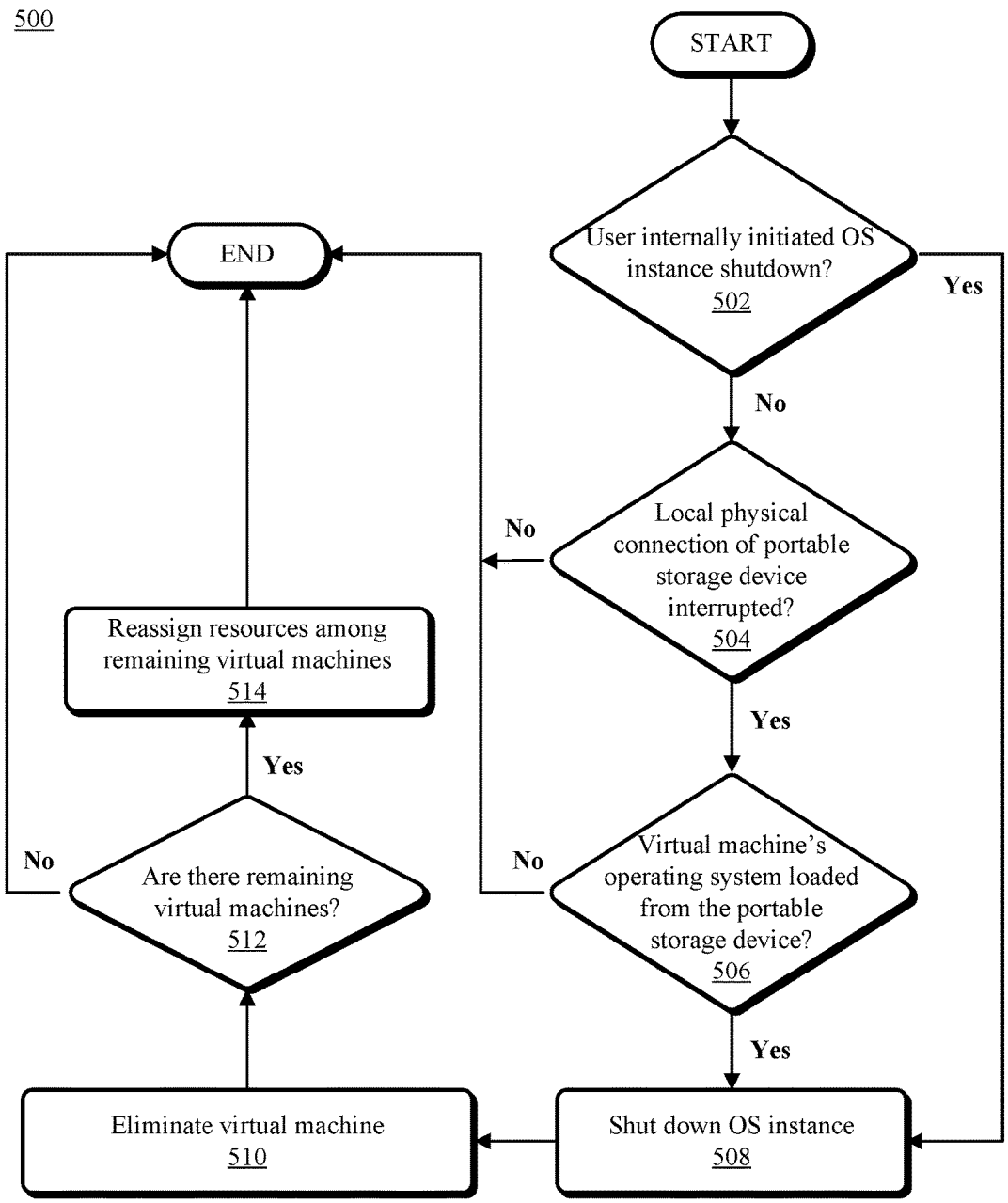
FIG. 5 illustrates a flowchart of an example method for locally disconnecting portable storage devices with operating systems thereon to eliminate a virtual machine, in accordance with embodiments of the present disclosure.

Turning now to FIG. 5, illustrated is a flowchart of an example method 500 for eliminating a virtual machine in a computing environment, in accordance with embodiments of the present disclosure. The computing environment may include, for example, computer system 130 of FIG. 1 or computer system 230 of FIG. 2, and may take on the embodiment of exemplary eight-user device 300 of FIG. 3.

A user may internally initiate the shutdown of an operating system instance at 502. For example, a user may use a GUI interface or a key combination on a keyboard to initiate a shutdown of an OS instance. The OS instance shutdown occurs at 508.

If a user has not initiated an OS instance shutdown internally at 502, the user may initiate an OS instance shutdown externally by interrupting the physical portable storage device connection at 504.

If, at 504, a local physical connection of a portable storage device is interrupted, then a check is performed at 506 to determine whether any of the virtual machines' operating system instances were loaded from the disconnected portable storage device. For example, if a USB drive is disconnected from the computer system (e.g., the computer system 130 of FIG. 1 or the computer system 230 of FIG. 2), then the virtual machines running on the hypervisor will be checked to determine whether their operating instances were loaded from that USB drive.

If, at 506, it is determined that a virtual machine's operating system instance was loaded from the disconnected portable storage device, then that virtual machine's OS instance is shut down at 508. For example, if it is determined that a particular virtual machine is running an operating system instance loaded from the disconnected USB drive, then that particular virtual machine's OS instance will be shut down. For example, if a particular virtual machine is running an instance of WINDOWS XP, loaded from the disconnected USB drive, then that particular instance of WINDOWS XP will be shut down.

At 510, the virtual machine that was running the OS instance that was shut down at 508 is eliminated. For example, if the virtual machine (e.g., virtual machine 180 from FIG. 1) was running an OS instance of RED HAT LINUX, and that RED HAT LINUX instance was shut down at 508, then the virtual machine (e.g., virtual machine 180 from FIG. 1) that had been running the instance of RED HAT LINUX may be terminated at 510.

At 512, it is determined whether any virtual machines remain running on the hypervisor. For example, if the eliminated virtual machine was one of four virtual machines, it will be determined that three virtual machines remain running on the hypervisor.

If one or more virtual machines remain running on the hypervisor, then the resources that were assigned to the eliminated machine are reassigned among the remaining virtual machines at 514. For example, if three virtual machines remain running on the hypervisor, then there will be unused resources at the hypervisor's disposal. The hypervisor will reassign the unused resources among the remaining virtual machines. For example, on a computer system with a type 1 hypervisor (e.g., the computer system 130 of FIG. 1), if three virtual machines remain running on the hypervisor, then there may be a set of resources equating to 25% of the plurality resources left unused. The type 1 hypervisor may then reassign a set of resources to each of the remaining three virtual machines, such that each set of resources equates to 33% of the plurality of resources. If, for example, the computer system has a type 2 hypervisor (e.g., the computer system of FIG. 2), then there will be a set of resources dedicated to the computer system's OS. For example, the computer system's OS may have 5% of the plurality of resources dedicated to it. If there are three virtual machines that remain running on the hypervisor, then there may be a set of resources equating to 23.75% of the plurality of resources left unused. The type 2 hypervisor may then reassign a set of resources to each of the remaining three virtual machines, such that each set of resources equates to 31.6% of the plurality of resources. The percentage of resources reassigned to the remaining virtual machines may be an even percentage across the remaining virtual machines, or it may be uneven, as described herein, with each virtual machine receiving a similar or different percentages of the plurality of resources.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for generating virtual machines running operating systems from operating system images on portable storage devices as they are locally connected to a computer system with a plurality of resources, a plurality of portable storage device ports, and a hypervisor, the system comprising:
   a memory;
   a processor in communication with the memory, the processor being configured to perform a method comprising:
   wherein the computer system is embodied in an octagonal ring, wherein each outer facet of the ring includes two portable storage device ports, an audio input port, and an audio output port, and wherein each inner facet of the ring includes a power supply port and a visual device port;
   detecting a local physical connection of a first portable storage device to a first portable storage device port of the computer system, the first portable storage device having a first operating system image stored thereon;
   generating, via the hypervisor, a first virtual machine running a first operating system by loading the first operating system from the first operating system image on the first portable storage device and assigning a first set of the plurality of resources to the first operating system;
   detecting, while the first virtual machine is running, a local physical connection of a second portable storage device to a second portable storage device port of the computer system, the second portable storage device having a second operating system image stored thereon; and
   generating, via the hypervisor, a second virtual machine running a second operating system by loading the second operating system from the second operating system image on the second portable storage device and assigning a second set of the plurality of resources to the second operating system, the assigning the second set of the plurality of resources comprising reassigning resources from the first set of the plurality of resources, wherein the first set of the plurality of resources and the second set of the plurality of resources are not equal percentages of the plurality of resources.

2. The system of claim 1, wherein the hypervisor is a type 1 hypervisor.

3. The system of claim 1, wherein the hypervisor is a type 2 hypervisor.

4. The system of claim 1, wherein the computer system is locally connected to a set of computer stations, the set of computer stations including a first station associated with the first virtual machine, a first outer facet of the computer system, and a first inner facet of the computer system, and a second station associated with the second virtual machine, a second outer facet of the computer system, and a second inner facet of the computer system, each computer station comprising:
   at least one input device;
   at least one audio input device;
   at least one audio output device; and
   at least one visual display device.

5. The system of claim 1, wherein the first and second operating systems are different operating systems.

6. The system of claim 1, wherein the number of virtual machines the hypervisor is allowed to generate is limited to the number of physical cores in the computer system's CPU.

7. The system of claim 1, wherein the portable storage device port is a USB port, and the portable storage device is a USB drive.

8. A computer program product comprising a computer readable storage medium having program instructions embodied therewith, the program instructions executable by a processor to cause the processor to perform a method comprising:
   wherein the processor is included in a computer system running a hypervisor, wherein the computer system is embodied in an octagonal ring, wherein each outer facet of the ring includes two portable storage device ports, an audio input port, and an audio output port, and wherein each inner facet of the ring includes a power supply port and a visual device port;

detecting a local physical connection of a first portable storage device to a first portable storage device port of the computer system, the first portable storage device having a first operating system image stored thereon;

generating, via the hypervisor, a first virtual machine running a first operating system by loading the first operating system from the first operating system image on the first portable storage device and assigning a first set of the plurality of resources to the first operating system;

detecting, while the first virtual machine is running, a local physical connection of a second portable storage device to a second portable storage device port of the computer system, the second portable storage device having a second operating system image stored thereon; and generating, via the hypervisor, a second virtual machine running a second operating system by loading the second operating system from the second operating system image on the second portable storage device and assigning a second set of the plurality of resources to the second operating system, the assigning the second set of the plurality of resources comprising reassigning resources from the first set of the plurality of resources, wherein the first set of the plurality of resources and the second set of the plurality of resources are not equal percentages of the plurality of resources.

9. The computer program product of claim 8, wherein the hypervisor is a type 1 hypervisor.

10. The computer program product of claim 8, wherein the computer system is locally connected to a set of computer stations, the set of computer stations including a first station associated with the first virtual machine, a first outer facet of the computer system, and a first inner facet of the computer system, and a second station associated with the second virtual machine, a second outer facet of the computer system, and a second inner facet of the computer system, each computer station comprising:
- at least one input device;
- at least one audio input device;
- at least one audio output device; and
- at least one visual display device.

11. The computer program product of claim 8, wherein the first and second operating systems are different operating systems.

12. The computer program product of claim 8, wherein the number of virtual machines the hypervisor is allowed to generate is limited to the number of physical cores in the computer system's CPU.

13. The computer program product of claim 8, wherein the portable storage device port is a USB port, and the portable storage device is a USB drive.

* * * * *